United States Patent
He et al.

(10) Patent No.: US 7,403,611 B1
(45) Date of Patent: Jul. 22, 2008

(54) SMALL SIZE HANDS-FREE SPEAKERPHONE APPARATUS

(75) Inventors: Qin He, Newark, CA (US); Ming Zhang, Cupertino, CA (US); Wan-Chieh Pai, San Jose, CA (US); Ioudin Jean Chen, Saratoga, CA (US)

(73) Assignee: Fortemedia, Inc., Cupertino, CA (US)

( * ) Notice: Subject to any disclaimer, the term of this patent is extended or adjusted under 35 U.S.C. 154(b) by 854 days.

(21) Appl. No.: 10/941,154

(22) Filed: Sep. 15, 2004

Related U.S. Application Data

(60) Provisional application No. 60/562,120, filed on Apr. 13, 2004.

(51) Int. Cl.
H04M 1/00 (2006.01)
H04M 9/00 (2006.01)

(52) U.S. Cl. .................. 379/420.01; 379/388.02; 455/569.1

(58) Field of Classification Search ............ 379/388.01, 379/388.02, 406.01, 419, 420.01, 420.02, 379/420.03, 420.04; 455/569.1, 569.2, 570, 455/557; 381/92, 94.2, 94.3, 71.6, 355, 356, 381/357, 386, 387; 181/198, 199
See application file for complete search history.

(56) References Cited

U.S. PATENT DOCUMENTS

| | | | | |
|---|---|---|---|---|
| 5,226,076 A | * | 7/1993 | Baumhauer et al. .... | 379/420.02 |
| 5,896,461 A | * | 4/1999 | Faraci et al. ................. | 381/386 |
| 6,957,089 B2 | * | 10/2005 | Oh et al. ................... | 455/569.1 |
| 2003/0224726 A1 | * | 12/2003 | Shearer et al. ............. | 455/41.1 |

* cited by examiner

*Primary Examiner*—Curtis Kuntz
*Assistant Examiner*—Tuan D Nguyen
(74) *Attorney, Agent, or Firm*—Thomas, Kayden, Horstemeyer & Risley

(57) ABSTRACT

A small-footprint hands-free speakerphone apparatus includes a loudspeaker, at least one main microphone, at least one reference microphone, and openings for receiving sound. The loudspeaker is disposed within a speaker chamber. Each microphone is mounted in a microphone boot formed by an acoustic opaque resilient material. Each main microphone may be omni-directional or directional. Each reference microphone is omni-directional. An opening is formed in front of each microphone for receiving sound for the microphone. An opening is formed in back of each directional main microphone for receiving sound and forming directivity for the microphone. An opening is formed in the microphone boot for each reference microphone to receive sound from the loudspeaker. An opening may also be formed in the loudspeaker chamber for passing sound to the reference microphone. The apparatus may include one or more interface units to provide interface to external devices.

20 Claims, 4 Drawing Sheets

SMALL SIZE HANDS-FREE SPEAKERPHONE APPARATUS

CROSS-REFERENCES TO RELATED APPLICATIONS

This application claims the benefit of provisional U.S. Application Ser. No. 60/562,120, entitled "Small Size Speakerphone Apparatus with Different Communication Channels," filed Apr. 13, 2004, which is incorporated herein by reference in its entirety for all purposes.

BACKGROUND

The present invention relates generally to communication, and more specifically to a hands-free speakerphone apparatus.

Hands-free speakerphone devices are commonly used for many applications such as speakerphone, hands-free car kit, teleconferencing system, cellular phone, hands-free voice recognition devices, and so on, and in various environments such as car, home, office, hotel, and so on. Hands-free speakerphone devices allow users to speak into microphones placed at some distance away from the users and to listen to sound via speakerphones also placed away from the users. Hands-free speakerphone devices are thus convenient and comfortable to use, and are also safer to use than hands-on or hand-held devices in certain situations, e.g., when driving a car. Hands-free speakerphone devices may also be designed for use with different communication channels such as, e.g., digital wireline channels (e.g., data/computer networks), analog channels (e.g., conventional telephone lines), wireless channels (e.g., cellular phones), and so on. As used herein, a communication channel is a means via which a hands-free speakerphone device exchanges signals with a remote or far-end device.

A hands-free speakerphone device typically includes a loudspeaker and one or more microphones. When the hands-free speakerphone device is small in size, the close proximity of the loudspeaker to the microphones can cause some major problems. For example, when a speech signal from a remote user is outputted from the loudspeaker, a portion of this speech signal may be reflected to the microphones and transmitted back to the remote user. This acoustic disturbance is referred to as echo. In general, users are annoyed by hearing their own voice delayed, for example, by the path of the system. In certain instances, acoustic shock or howling may be caused by the speakerphone device becoming unstable due to the microphones picking up reflections of the acoustic signal emitted by the loudspeaker.

Hands-free speakerphone devices are described in various literatures including U.S. Patent Application Serial Nos. US 2003/0086562 and US 2002/0183101. U.S. Patent Application Serial No. US 2003/0086562 describes using an anti-sealing feature for hands-free speakerphone to alleviate acoustic leakage. U.S. Patent Application Serial No. US 2002/0183101 describes using an attenuator to cancel acoustic feedback with cellular phone. However, the techniques described in these U.S. patent applications do not provide good performance for true hands-free full-duplex communications.

As can be seen, a hands-free speakerphone device that can effectively provide hands-free communication is highly desirable.

SUMMARY

Various embodiments of a hands-free speakerphone apparatus having good performance and a small footprint are described herein. The hands-free speakerphone apparatus includes a loudspeaker, multiple microphones, and appropriate openings for receiving sound. The loudspeaker is disposed within a speaker chamber that is formed within a case. The multiple microphones include at least one main microphone and at least one reference microphone. Each main microphone is mounted in a microphone boot that is formed with an acoustic opaque resilient material. Each reference microphone is also mounted in a microphone boot that is also formed with the acoustic opaque resilient material.

Each main microphone may be an omni-directional microphone or a directional microphone. An opening is formed in front of each main microphone for receiving sound for the main microphone. For each directional main microphone, one or more openings are formed in back of the main microphone for receiving sound from the main microphone and forming directivity for the main microphone.

Each reference microphone is an omni-directional microphone. An opening is also formed in front of each reference microphone for receiving sound for the reference microphone. An opening is also formed in the microphone boot for each reference microphone to receive sound from the loudspeaker for the reference microphone. An opening may also be formed in the loudspeaker chamber for passing sound to the reference microphone.

The hands-free speakerphone apparatus may include one or more interface units to provide interface to external devices and systems. For example, a wireless interface unit (e.g., a Bluetooth module) may provide interface to a wireless communication system, a wireline interface unit (e.g., a USB port) may provide interface to a wireline communication system, and a phone jack unit may provide interface to a telephone device.

Various other aspects, embodiments, and features of the invention are also provided, as described in further detail below.

DETAILED DESCRIPTION

Figure 1:
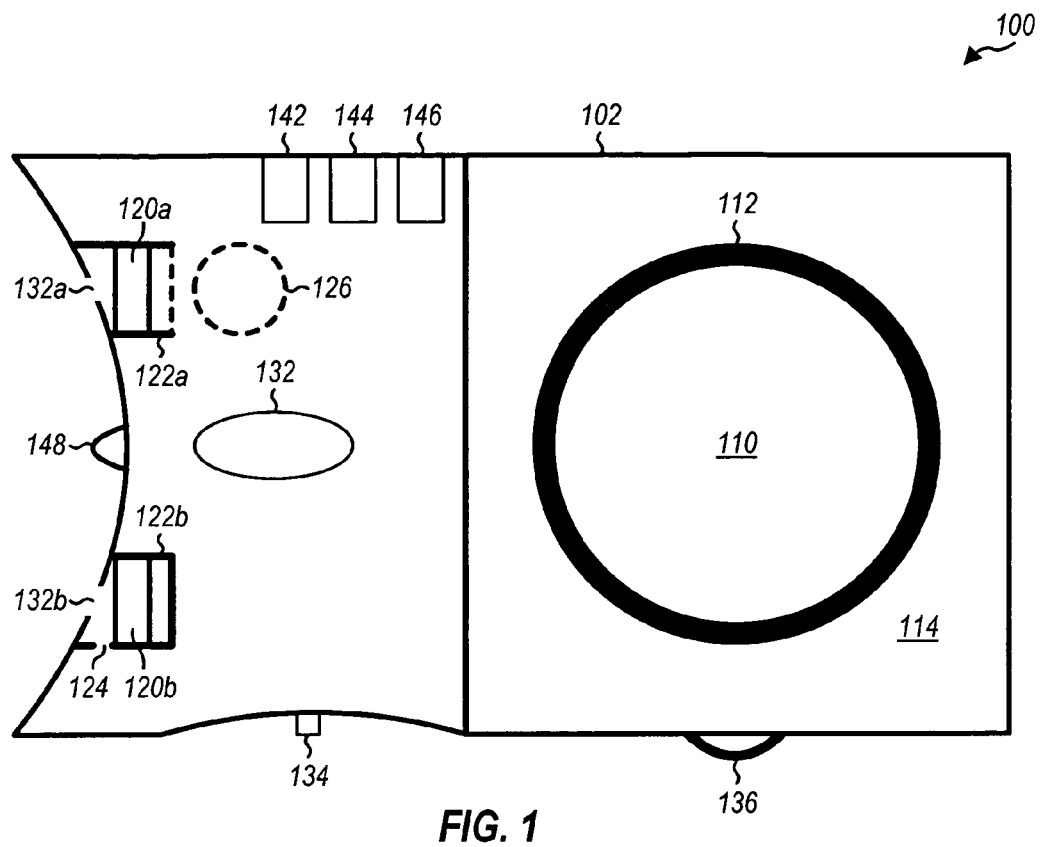
FIG. 1 shows a cross-sectional top view of an embodiment of a hands-free speakerphone apparatus.

FIG. 1 shows a cross-sectional view of the top of a speakerphone apparatus 100, which is an embodiment of the hands-free speakerphone apparatus. For this embodiment, speakerphone apparatus 100 includes a loudspeaker 110 and two microphones 120a and 120b, which are placed at different locations relative to loudspeaker 110. Microphone 120b may be located closer to loudspeaker 110 than microphone 120a, or both microphones may be placed at approximately the same distance from loudspeaker 110. Loudspeaker 110 may be mounted on (and within) a case 102 with an acoustic opaque resilient material 112. This material reduces vibration from the loudspeaker to the case but does not alter the acoustic signal from the loudspeaker. Loudspeaker 110 is also installed within a loudspeaker chamber 114. For the embodiment shown in FIG. 1, loudspeaker chamber 114 is formed specifically to house the loudspeaker and enhances the loudspeaker's volume and quality. Microphone 120a is used as a main microphone and may be an omni-directional microphone or a directional microphone that may have any beam pattern. For example, a directional microphone may be a cardioid microphone having a heart-shaped beam pattern. Microphone 120b is used as a reference microphone and may be an omni-directional microphone.

Microphones 120a and 120b are mounted inside microphone boots 122a and 122b, respectively. For the embodiment shown in FIG. 1, microphones 120a and 120b face the same direction, which is the left edge of the drawing page. Microphone boots 122a and 122b may be made of acoustic opaque resilient material. Openings 132a and 132b are formed in front of microphones 120a and 120b, respectively, to receive sound from the outside. An opening 124 is formed on one side of reference microphone boot 122b to allow reference microphone 120b to receive more sound from loudspeaker 110. Opening 124 may not be needed if the main microphone is a directional microphone. An opening 126 may be formed at the back of microphone 120a (if microphone 120a is a directional microphone) to allow sound to travel back and form the directivity of microphone 120a.

A button 132 is used to control the operating state of speakerphone apparatus 100. A button 134 powers on and off speakerphone apparatus 100. A button 136 controls volume up and volume down as well as other states of speakerphone apparatus 100. Speakerphone apparatus 100 may include any number of peripheral ports for any number of communication channels. For example, speakerphone apparatus 100 may include (1) a Universal Serial Bus (USB) port 142 used to send and receive signals from other devices with USB capability such as, e.g., a personal computer (PC), a personal digital assistant (PDA), and so on, (2) a phone jack 144 used to send and receive signals from conventional phones, and/or (3) other ports. A power charger port 146 is used to charge the battery of speakerphone apparatus 100. A ring 148 is used as a tie for holding the case.

Figure 2:
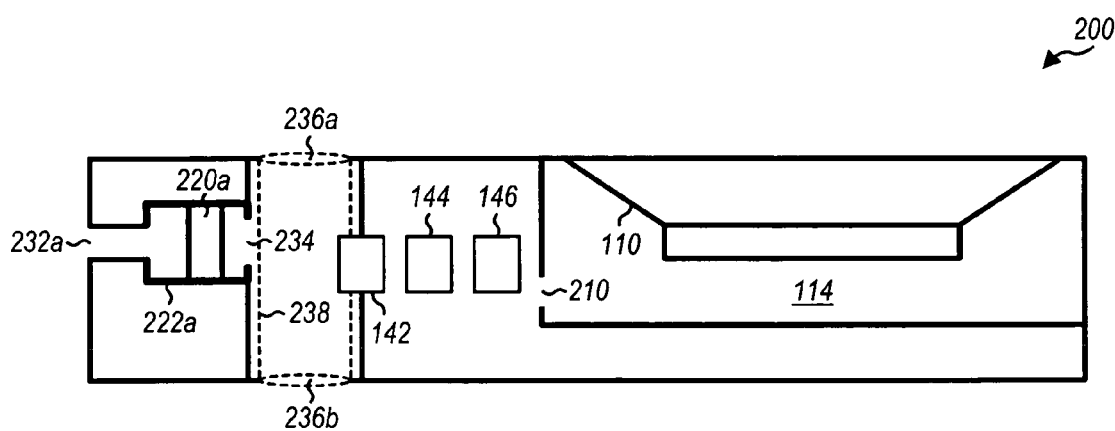
FIGS. 2 through 4 show cross-sectional side views of three embodiments of the hands-free speakerphone apparatus.

FIG. 2 shows a cross-sectional view of the side of a speakerphone apparatus 200, which is another embodiment of the hands-free speakerphone apparatus. Speakerphone apparatus 200 includes (1) a directional microphone 220a in place of microphone 120a in speakerphone apparatus 100 in FIG. 1 and (2) omni-directional microphone 120b (not shown in FIG. 2), which is used as the reference microphone. Directional microphone 220a is used as the main microphone and is mounted in a microphone boot 222a. An opening 232a is formed in front of microphone 220a to receive sound from the outside. Two openings 236a and 236b (which generally correspond to opening 126 in FIG. 1) are specially formed with a tube 238 for directional microphone 220a. An opening 234 is formed in microphone boot 222a at the back of directional microphone 220a and within tube 238 to receive the sound coming through openings 236a and 236b. An opening 210 is formed on a wall of loudspeaker chamber 114 to leak sound from loudspeaker 110 to reference microphone 120b.

Figure 3:
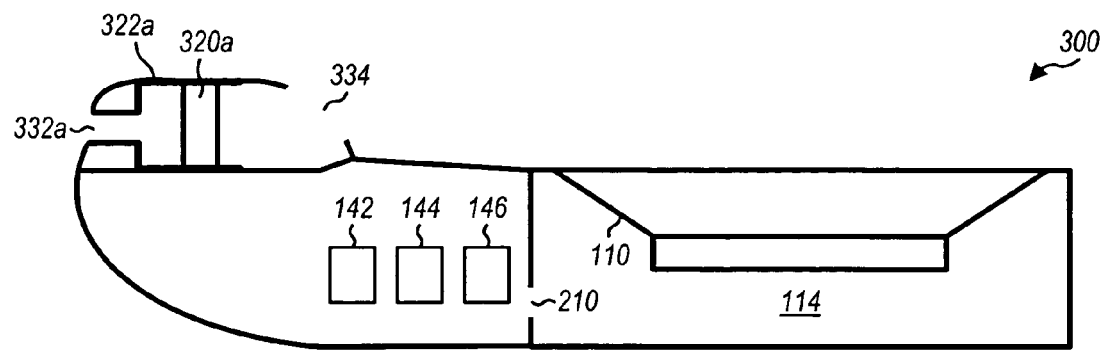

FIG. 3 shows a cross-sectional view of the side of a speakerphone apparatus 300, which is yet another embodiment of the hands-free speakerphone apparatus. Speakerphone apparatus 300 includes (1) a directional microphone 320a in place of microphone 120a in speakerphone apparatus 100 in FIG. 1 and (2) omni-directional microphone 120b (not shown in FIG. 3), which is used as the reference microphone. Directional microphone 320a is used as the main microphone and is mounted in a microphone boot 322a. Directional microphone 320a and microphone boot 322a protrude up and form an opening 334 at the back of microphone 320a. Opening 334 allows sound to go back to form the directivity of microphone 320a. Another opening 332a is formed in front of microphone 320a to receive sound from the outside.

Figure 4:
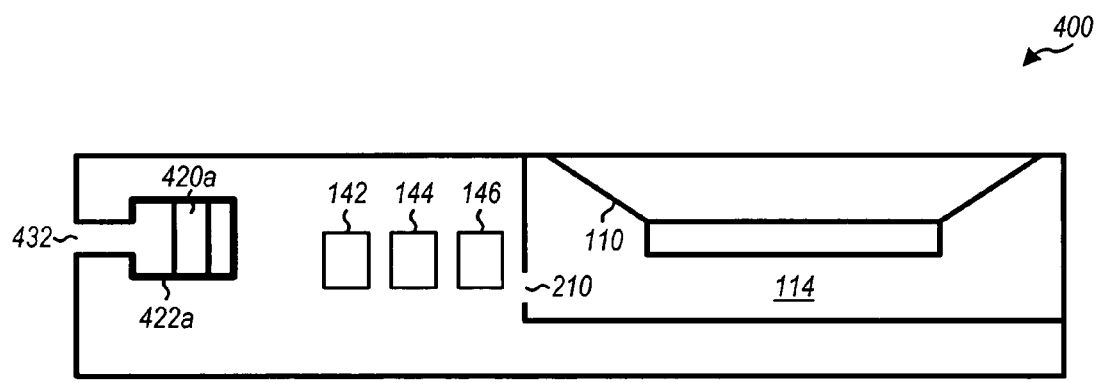

FIG. 4 shows a cross-sectional view of the side of a speakerphone apparatus 400, which is yet another embodiment of the hands-free speakerphone apparatus. Speakerphone apparatus 400 includes (1) an omni-directional microphone 420a in place of microphone 120a in speakerphone apparatus 100 in FIG. 1 and (2) omni-directional microphone 120b (not shown in FIG. 4), which is used as the reference microphone. Omni-directional microphone 420a is used as the main microphone and is mounted in a microphone boot 422a. An opening 432 is formed in front of microphone 420a to receive sound from the outside. An opening is not required at the back of omni-directional microphone 420a, unlike directional microphone 220a for speakerphone apparatus 200 in FIG. 2 and directional microphone 320a for speakerphone apparatus 300 in FIG. 3.

Figure 5C:
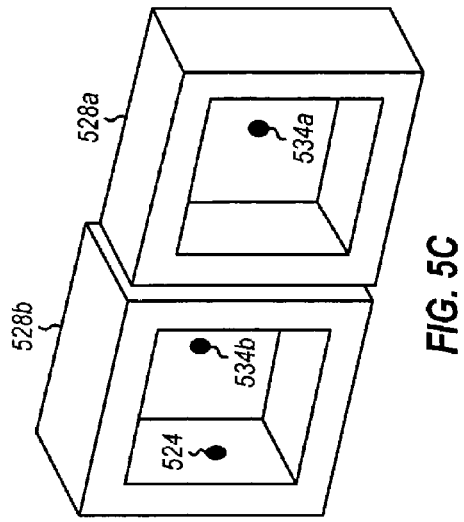
FIGS. 5A through 5D show perspective views of another embodiment of the hands-free speakerphone apparatus.
Figure 5D:
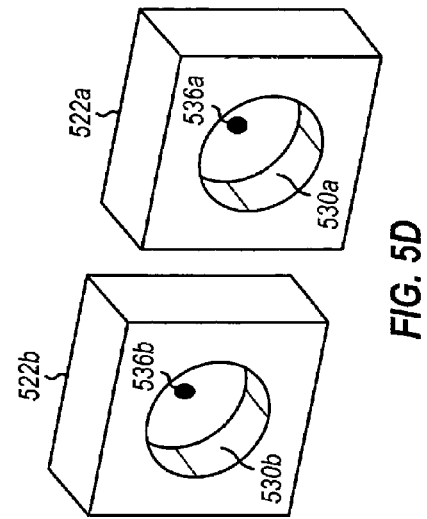
Figure 5A:
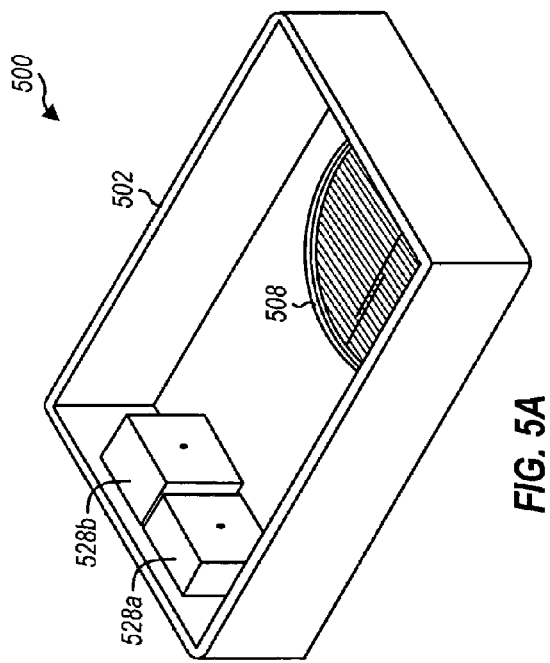

FIG. 5A shows a perspective view of a speakerphone apparatus 500, which is yet another embodiment of the hands-free speakerphone apparatus. Speakerphone apparatus 500 includes (1) an omni-directional microphone (not shown in FIG. 5A) that is mounted within a microphone housing 528a (a directional microphone would need to be mounted specially (with a hole at back), e.g., as shown in FIG. 3) and (2) an omni-directional microphone (also not shown in FIG. 5A) that is mounted within a microphone housing 528b. The two omni-directional microphones within microphone housings 528a and 528b are used as the main and reference microphones, respectively. Microphone housings 528a and 528b are mounted against one side of a case 502. A loudspeaker (not shown in FIG. 5) is mounted such that it faces a speaker grill 508. For this embodiment, the loudspeaker chamber is naturally formed by the case itself.

Figure 5B:
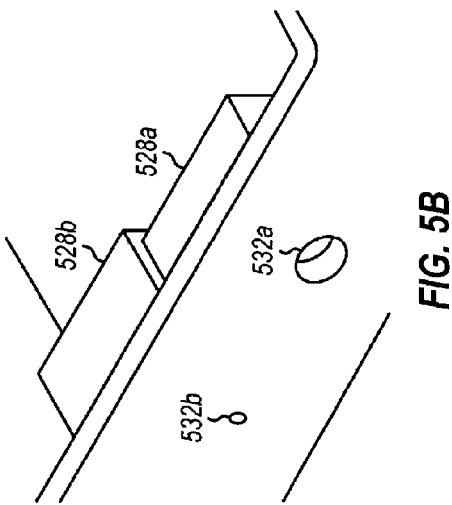

FIG. 5B shows another perspective view of speakerphone apparatus 500. An opening 532a is formed in front of the main microphone, which is mounted within microphone housing 528a, to receive sound from the outside for the main microphone. Similarly, an opening 532b is formed in front of the reference microphone, which is mounted within microphone housing 528b, to receive sound from the outside for the reference microphone. In general, opening 532b is smaller than the opening 532a.

FIG. 5C shows a perspective view of microphone housings 528a and 528b. An opening 524 is formed on one side of reference microphone housing 528b to allow the reference microphone to receive more sound from the loudspeaker internally. Openings 534a and 534b are formed in back of microphone housings 528a and 528b, respectively, to route wires for the microphones. Openings 534a and 534b do not serve any acoustic purpose and should be sealed after wiring.

FIG. 5D shows a perspective view of microphone boots 522a and 522b, which are mounted within microphone housings 528a and 528b, respectively. Cavities 530a and 530b are formed on one face of microphone boots 522a and 522b, respectively, and are used to house the main and reference microphones, respectively. Openings 536a and 536b are formed in back of microphone boots 522a and 522b, respectively, to route wires for the microphones.

Figure 6:
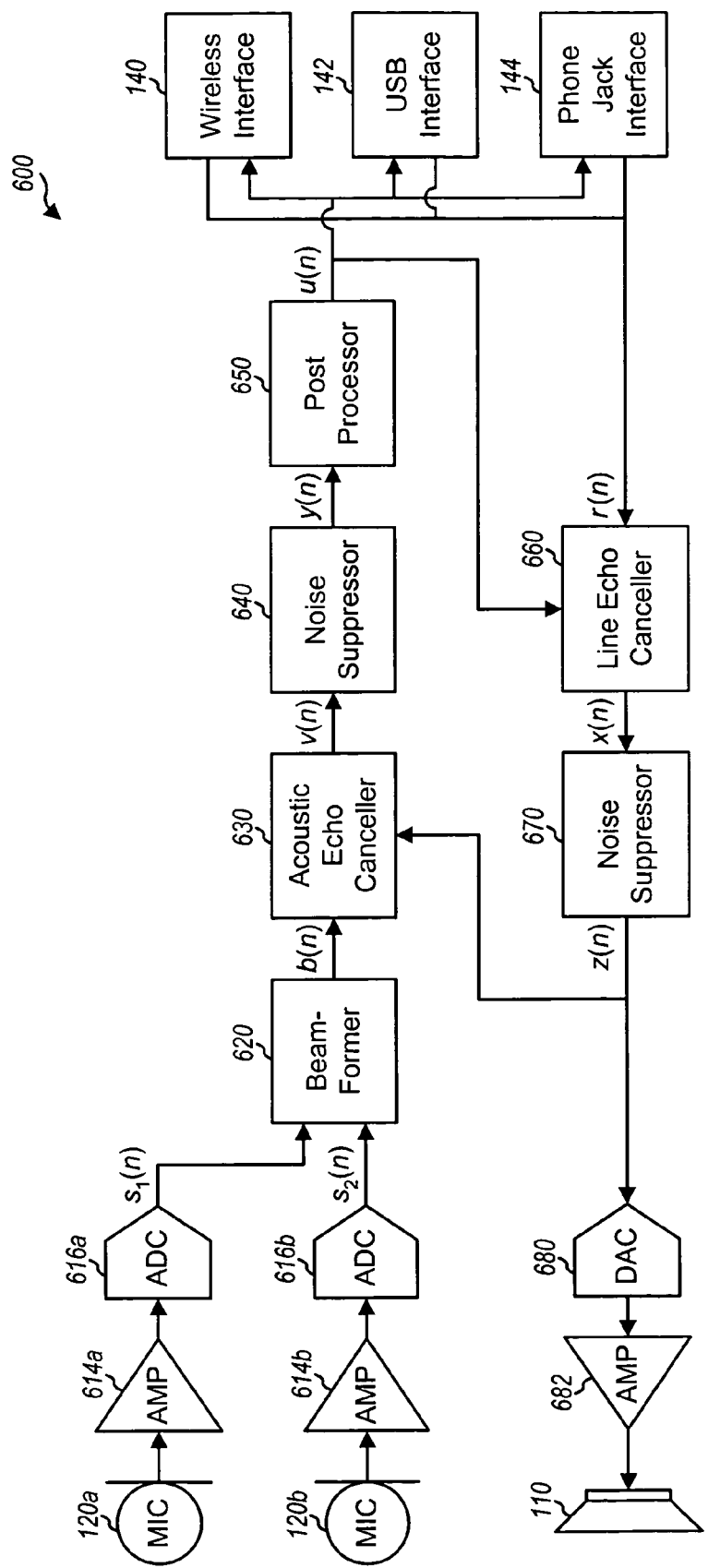
FIG. 6 shows a block diagram of processing units for the hands-free speakerphone apparatus.

FIG. 6 shows a block diagram of an embodiment of a hands-free speakerphone apparatus 600, which includes loudspeaker 110 and microphones 120a and 120b shown in FIG. 1.

For near-end speech, microphones 120a and 120b receive sound signals and provide these signals to amplifiers 614a and 614b, respectively. Each amplifier 614 amplifies its input signal and provides an amplified signal. An analog-to-digital converter (ADC) 616a receives and digitizes the first amplified signal from amplifier 614a and provides a main signal $s_1(n)$. An ADC 616b receives and digitizes the second amplified signal from amplifier 614b and provides a secondary signal $s_2(n)$. A beam-former 620 receives the main and secondary signals, performs beamforming on the two signals, and provides a beamformed signal b(n). An acoustic echo cancellation unit 630 receives the beamformed signal b(n) and an output z(n) from a noise suppression unit 670, performs acoustic echo cancellation to remove echo from loudspeaker 110, and provides an echo-canceled signal v(n).

A noise suppression unit 640 receives the echo-canceled signal v(n), performs noise suppression to remove noise in the v(n) signal, and provides a noise-suppressed signal y(n). A post-processor 650 receives the noise-suppressed signal y(n), performs post-processing, and provides a processed signal u(n), which is a digital data stream. After post-processor 650, the apparatus may provide the digital data stream to a wireless interface unit 140 and/or USB interface unit 142 and/or an analog signal to phone jack interface unit 144.

Wireless interface unit 140 provide communication via a wireless communication channel such as a Bluetooth (BT) network, an IEEE 802.11 wireless local area network (WLAN) (which is also called a Wi-Fi network), and so on. USB interface unit 142 provides communication via a wireline communication channel using USB. USB interface unit 142 may provide an interface to a USB port on a personal computer (PC) or a USB port on some other device. Phone jack interface unit 144 provides communication via a wireline communication channel used for conventional analog telephone. Different and/or other interface units may also be used in conjunction with, or in place of, the interface units shown in FIG. 6.

For far-end speech, interface units 140, 142, and/or 144 receive a far-end signal via their respective communication channels and provide the received signals to a line echo cancellation unit 660. Unit 660 also receives the processed signal u(n) from post-processor 650, performs line echo cancellation on the received signal r(n) from one of the interface units to remove echo from near-end voice, and provides an echo-canceled signal x(n). Noise suppression unit 670 receives the echo-canceled signal, performs noise suppression to remove noise, and provides a noise-suppressed signal z(n). The noise-suppressed signal is converted to analog by a digital-to-analog converter (DAC) 680. An amplifier 682 amplifies the analog signal and provides an amplified output signal to loudspeaker 110.

The various processing blocks in FIG. 6, such as beam-former 620, acoustic echo cancellation unit 630, noise suppression unit 640, line echo cancellation unit 660, and noise suppression unit 670 may be implemented in various manners known in the art. Exemplary techniques for performing beamforming, echo cancellation, and noise suppression are described in the following commonly assigned U.S. patent applications:

Ser. No. 10/193,689, entitled "Channel Control and Post Filter for Acoustic Echo Cancellation," filed Jul. 10, 2002;

Ser. No. 10/371,991, entitled "Method and System for Nonlinear Echo Suppression," filed Feb. 21, 2003;

Ser. No. 10/371,150, entitled "Small Array Microphone for Acoustic Echo Cancellation and Noise Suppression," filed Feb. 21, 2003; and Ser. No. 10/601,055, entitled "Small Array Microphone for Beam-Forming and Noise Suppression," filed Jun. 20, 2003.

These patent applications are incorporated herein by reference.

The beam-forming, echo cancellation, and noise suppression may be implemented by various means. For example, the beam-forming, echo cancellation, and noise suppression may be implemented in hardware, software, or a combination thereof. For a hardware implementation, the processing units used to perform echo cancellation and noise suppression may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A hands-free speakerphone apparatus comprising:
   a loudspeaker;
   a main microphone mounted in a first microphone boot;
   a reference microphone having omni-directivity and mounted in a second microphone boot;
   a first opening formed in front of the main microphone for receiving sound for the main microphone;
   a second opening formed in front of the reference microphone for receiving sound for the reference microphone; and
   a third opening formed in the second microphone boot for receiving sound from the loudspeaker for the reference microphone.

2. The apparatus of claim 1, further comprising:
   a case for holding the loudspeaker and the main and reference microphones.

3. The apparatus of claim 2, wherein the first and second openings are formed on a side of the case.

4. The apparatus of claim 1, wherein the first and second microphone boots are formed by an acoustic opaque resilient material.

5. The apparatus of claim 1, wherein the main microphone is an omni-directional microphone.

6. The apparatus of claim 1, wherein the main microphone is a directional microphone.

7. The apparatus of claim 6, further comprising:
   a fourth opening formed in back of the main microphone for receiving sound from the main microphone and forming directivity for the main microphone.

8. The apparatus of claim 7, further comprising:
   a fifth opening formed in back of the main microphone for receiving sound from the main microphone and forming directivity for the main microphone.

9. The apparatus of claim 2, wherein the loudspeaker is mounted to the case with a ring of acoustic opaque resilient material.

10. The apparatus of claim 2, wherein the loudspeaker is disposed within a speaker chamber.

11. The apparatus of claim 10, further comprising:
a fourth opening formed on a wall of the loudspeaker chamber for passing sound to the reference microphone.

12. The apparatus of claim 10, wherein the loudspeaker chamber is formed in back of the loudspeaker to enhance sound volume and quality.

13. The apparatus of claim 10, wherein the loudspeaker chamber is formed by the case.

14. The apparatus of claim 10, wherein the loudspeaker chamber is formed within the case to specifically house the loudspeaker.

15. The apparatus of claim 1, further comprising:
a wireline interface unit operable to provide an interface to a wireline communication device.

16. The apparatus of claim 15, wherein the wireline interface unit is a Universal Serial Bus (USB) port.

17. The apparatus of claim 1, further comprising:
a wireless interface unit operable to provide an interface to a wireless communication device.

18. The apparatus of claim 17, wherein the wireless interface unit is a Bluetooth module.

19. The apparatus of claim 1, further comprising:
a phone jack port operable to provide an interface to a telephone device.

20. A hands-free speakerphone apparatus comprising:
a loudspeaker disposed within a speaker chamber;
a main microphone mounted in a first microphone boot formed by an acoustic opaque resilient material;
a reference microphone having omni-directivity and mounted in a second microphone boot formed by the acoustic opaque resilient material;
a first opening formed in front of the main microphone for receiving sound for the main microphone;
a second opening formed in front of the reference microphone for receiving sound for the reference microphone;
a third opening formed in the second microphone boot for receiving sound from the loudspeaker for the reference microphone;
an interface unit operable to provide an interface to an external device; and
a case for holding the loudspeaker, the main and reference microphones, and the interface unit.

* * * * *